United States Patent
Amend et al.

(10) Patent No.: US 11,700,570 B2
(45) Date of Patent: Jul. 11, 2023

(54) MULTI-CONNECTIVITY RESTRICTION FOR SERVICES DEMANDING SINGLE-PATH OR SINGLE ACCESS

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 95 days.

(21) Appl. No.: 17/353,831

(22) Filed: Jun. 22, 2021

(65) Prior Publication Data

US 2021/0400563 A1 Dec. 23, 2021

(30) Foreign Application Priority Data

Jun. 23, 2020 (EP) .................................... 20181783

(51) Int. Cl.
| | |
|---|---|
| *H04W 24/00* | (2009.01) |
| *H04W 48/06* | (2009.01) |
| *H04W 40/24* | (2009.01) |
| *H04W 48/16* | (2009.01) |
| *H04W 48/20* | (2009.01) |

(52) U.S. Cl.
CPC ......... *H04W 48/06* (2013.01); *H04W 40/248* (2013.01); *H04W 48/16* (2013.01); *H04W 48/20* (2013.01)

(58) Field of Classification Search
CPC ..... H04W 48/06; H04W 48/16; H04W 48/20; H04W 40/248

USPC ......................................................... 370/329
See application file for complete search history.

(56) References Cited

U.S. PATENT DOCUMENTS

| | | |
|---|---|---|
| 2013/0078995 A1 | 3/2013 | Jouin |
| 2019/0394833 A1 | 12/2019 | Talebi Fard et al. |

FOREIGN PATENT DOCUMENTS

| | | |
|---|---|---|
| WO | WO 2019192528 A1 | 10/2019 |
| WO | WO 2019197016 A1 | 10/2019 |

*Primary Examiner* — Temica M Beamer
(74) *Attorney, Agent, or Firm* — Leydig, Voit & Mayer, Ltd.

(57) ABSTRACT

A method for restricting multi-connectivity functionality of a user equipment (UE) includes: storing a mapping table on a memory of the UE, wherein the mapping table provides assignment information about a respective single access mode assigned to a service requestable by the UE, wherein the respective single access mode is one of multiple access modes; receiving service information about a requested service via a network interface of the UE; comparing, by a process of the UE, the service information to entries of the mapping table, and selecting a single access mode assigned to the requested service; wherein the multi-connectivity functionality of the UE is restricted by: a bypass entity redirecting data traffic associated with the requested service directly to the selected single access mode; or a multipath scheduler scheduling data traffic associated with the requested service to a communication link that corresponds to the selected single access mode.

13 Claims, 4 Drawing Sheets

| Service | Identifier | Interface (bypassing the multi-connectivity service) |
|---|---|---|
| Deutsche Telekom Data Plan Service | URL(pass.telekom.de) | Cellular |
| Local Wi-Fi communication | IP_Subnet(192.168.1.1/24) | Wi-Fi |
| Multicast communication | IP_Subnet(224.0.0.0/4) | Wi-Fi |
| Broadcast | IP(255.255.255.255) | Wi-Fi |
| TV-Service | AppName("magentaTV") | Wi-Fi preferred otherwise cellular |
| DNS Nameserver outside local Wi-Fi subnet | IP(10.0.0.5) | Wi-Fi |
| Football stadium internal live broadcast | AppName("Bayern Muenchen Stadion Live") | Wi-Fi when SSID="Bayern Muenchen Stadion" Else Cellular |

MULTI-CONNECTIVITY RESTRICTION FOR SERVICES DEMANDING SINGLE-PATH OR SINGLE ACCESS

CROSS-REFERENCE TO PRIOR APPLICATIONS

Priority is claimed to European Patent Application No. EP 2018 17 83.0, filed on Jun. 23, 2020, the entire disclosure of which is hereby incorporated by reference herein.

FIELD

The invention relates to a method, a user equipment and a communication system in a multi-connectivity framework.

BACKGROUND

Typically, Internet network operators provide one or multiple access like fixed (e.g. xDSL), Wi-Fi (e.g. public Hotspots) or cellular (e.g. 2G-5G) to customers. These different accesses provide the data traffic via respective communication links. Each of the different accesses/communication links are based on a different transmission technology. Hybrid access or 3GPP ATSSS communication environments are based on those multiple accesses.

User equipments (UEs) like smartphones are in principle capable of connecting to multiple accesses simultaneously. However, currently multi-connectivity technologies are not used very frequently because no multi-connectivity functionality is being implemented by requested services and/or by many providers of services. The typical situation is as follows, the smartphone is capable of multi-connectivity to a Wi-Fi network and at the same time to a cellular network, while the requested application is restricted to only one access and is therefore unable to benefit from a second available access in terms of reliability and speed. It is not possible to access such a service in multi-connectivity mode of the smartphone.

Network protocols which can leverage the potential of multiple accesses like MPTCP, (MP-)QUIC, MPDCCP and SCTP are not widely adopted and usually require an end-to-end implementation. A broad and fast availability is therefore unlikely.

Standardized multi-connectivity architectures like 3GPP ATSSS "3GPP Technical Specification: 23.501, Version 16.3.0, 22 Dec. 2019" promise to provide remedy and use such protocols between UEs and access operator networks. Furthermore, this offers a comprehensive traffic management capability to operators of such architectures. ATSSS manages simultaneous connectivity for UEs over cellular (3GPP access) and non-cellular access (untrusted non-3GPP access e.g. Wi-Fi) and is depicted in FIG. 1.

FIG. 1 illustrates an exemplary ATSSS architecture as defined by the 3GPP TS 23.501. In FIG. 1, the ATSSS manages simultaneous connectivity for UEs over cellular (3GPP access) and non-cellular access (untrusted non-3GPP access e.g. Wi-Fi). As shown in FIG. 1, the UE connects to a Data Network (DN) over cellular (3GPP Access) and Wi-Fi (Untrusted Non-3GPP access) using the N3 interface towards the ATSSS-UPF (User Plane Function) part of a 5G Core.

In FIG. 1, the untrusted non-3GPP access path is interconnected with the 5G Core through the non-3GPP Interworking (N31WF) entity/function, which is responsible to attach the non-3GPP access to the 5G core. The UPF can be understood as the interface between UE and Data Network (e.g. Internet) taking responsibility for traffic management. Other entities/functions forming part of the 5G Core as shown in FIG. 1 are: Authentication Server Function (AUSF), Unified Data Management (UDM), Access and Mobility Management Function (AMF), Session Management Function (SMF), Policy Control Function (PCF) and Application Function (AF) including the control plane and user plane. Further, FIG. 1 also shows the name of the interfaces that are exposed by each of these entities.

The BBF and the Internet Engineering Task Force (IETF) specifies the residential use case, known as hybrid access. Currently BBF re-defines hybrid access to work with ATSSS also. Hybrid access combines therefore fixed access (xDSL or fiber) and cellular access within a Residential Gateway (RG).

Multi-connectivity network architectures independent from a particular access provider, are exemplary depicted in FIG. 2.

FIG. 2 illustrates the ATSSS protocol stack for untrusted 3GPP access (Wi-Fi) with Internet Protocol Security (IPsec) tunneling as defined by the 3GPP (FIG. 1). IPsec is a secure network protocol that authenticates and encrypts the packets of data to provide secure encrypted communication between two devices over an Internet Protocol network. In this scenario ATSSS defines an implementation of the multi-connectivity termination point (ATSSS UPF) into the cellular 5G network and integrates the potential independent Wi-Fi through IPsec tunneling. The IPsec tunnel is built between the UE and the Non 3GPP Interworking Function (N3IWF) entity (depicted in FIG. 2 as part of the protocol stack) over Wi-Fi (untrusted non-3GPP access network) and encapsulates 3GPP related information and the user plane traffic exchanged between UE and UPF.

US 2013/0078995 A1 describes a wireless communication device that includes a cellular telephony module to access a cellular network, a wireless communication module to access a non-cellular network, an antenna configured to be in wireless communication with a plurality of compatible and currently accessible communication networks including the cellular and non-cellular networks, and a mobile network selector to select a compatible and currently accessible communication network for current access by the wireless communication device based on a network characteristic other than network speed.

However, there are services existing, which have a special demand on being transmitted via only a single access. However, so far there is no possibility to provide a UE in a multi-connectivity scenario with information regarding that a particular service is only accessible via a single access or via only a single commination link with a defined transmission technique.

SUMMARY

In an exemplary embodiment, the present invention provides a method for restricting multi-connectivity functionality of a user equipment (UE). The method includes: storing a mapping table on a memory of the UE, wherein the mapping table provides assignment information about a respective single access mode assigned to a service requestable by the UE, wherein the respective single access mode is one of multiple access modes; receiving service information about a requested service via a network interface of the UE; comparing, by a process of the UE, the service information to entries of the mapping table, and selecting a single access mode assigned to the requested service. The multi-connectivity functionality of the UE is restricted by: a bypass entity redirecting data traffic associated with the requested service directly to the selected single access mode; or a multipath scheduler scheduling data traffic associated with the requested service to a communication link that corresponds to the selected single access mode.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
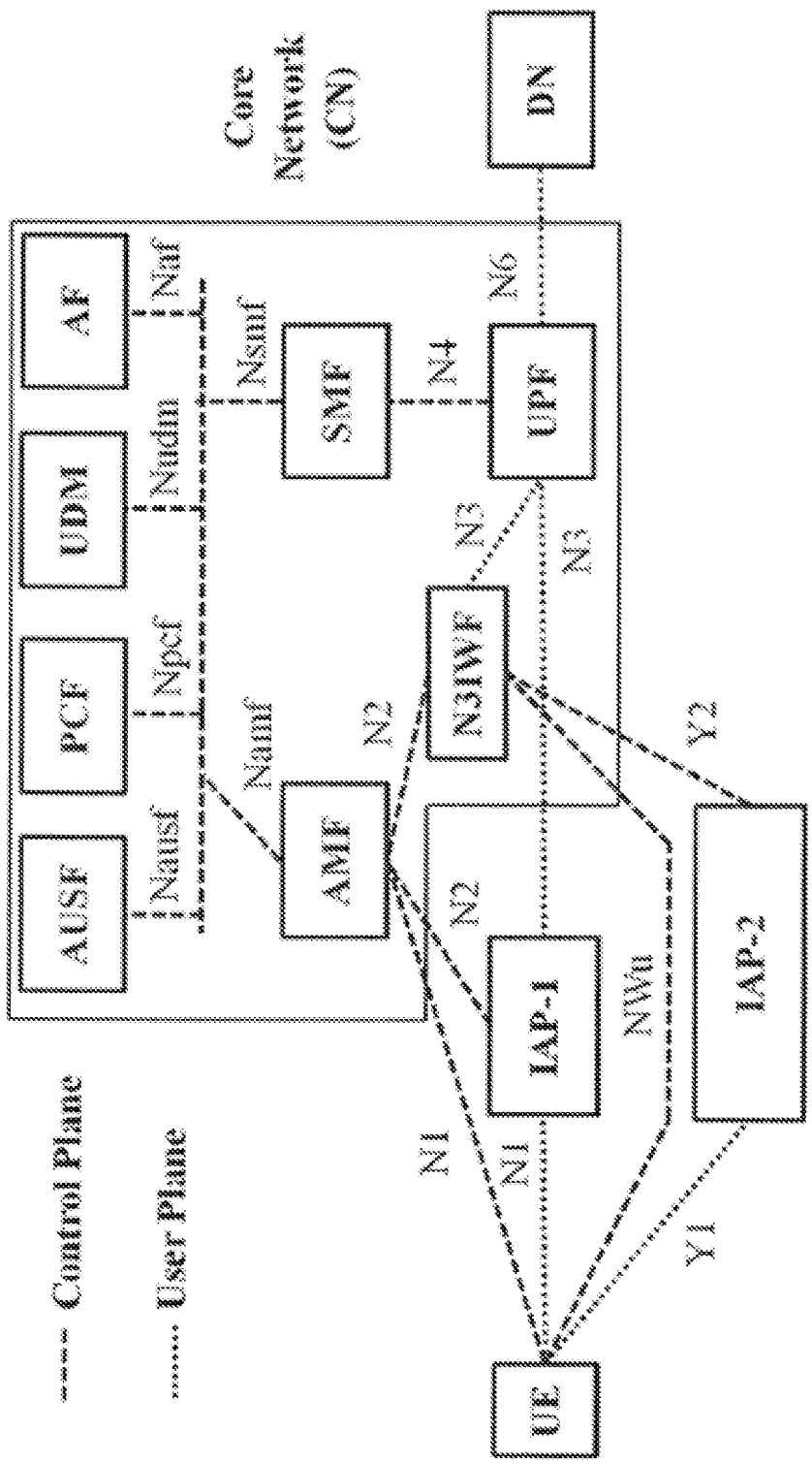
FIG. 1 illustrates an exemplary ATSSS architecture as defined by 3GPP TS 23.501.
Figure 2:
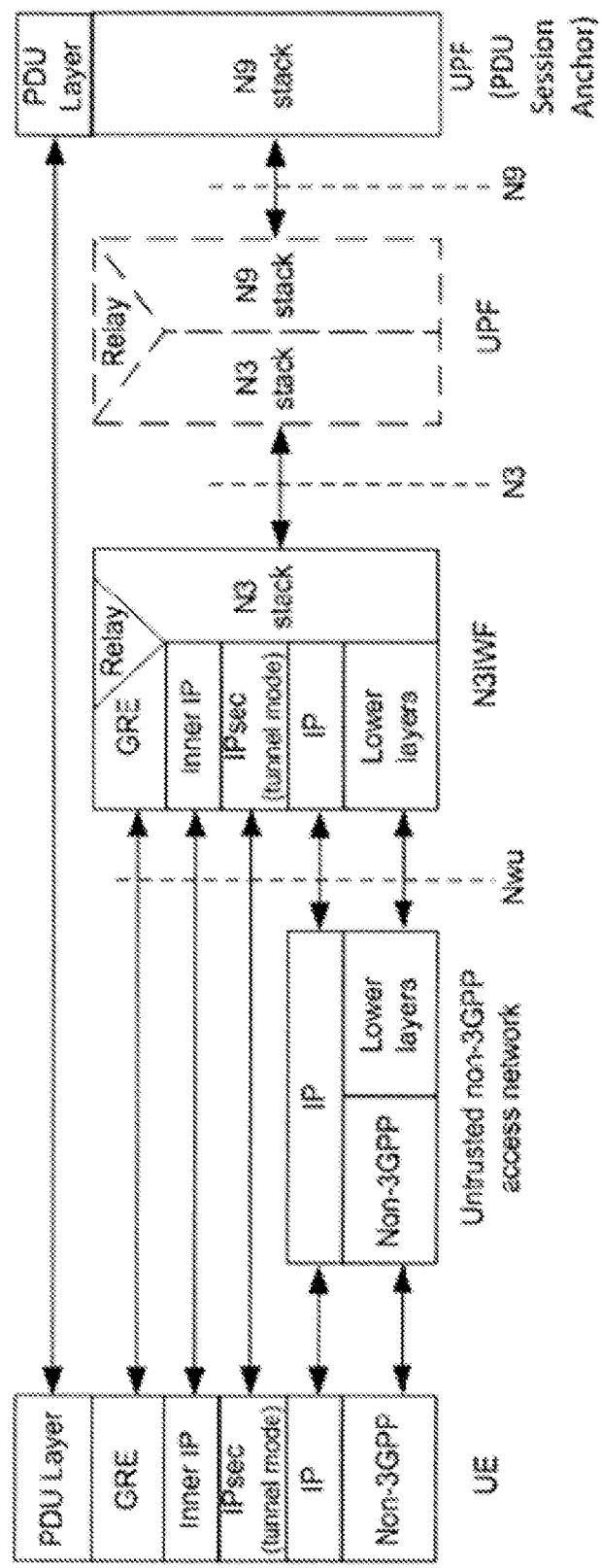
FIG. 2 illustrates the ATSSS protocol stack for untrusted 3GPP access (Wi-Fi) with IPsec tunneling as defined by 3GPP TS 23.501.

Exemplary embodiments of the present provide a method, a UE and a communication system that enable to take single access restrictions of services into account.

The features of the various aspects of the invention described below or the various examples of implementation may be combined with each other, unless this is explicitly excluded or is technically impossible.

According to a first aspect, the invention provides a method to restrict a multi-connectivity functionality of a user equipment (UE), the method comprising the following steps:

Storing a mapping table on a memory-unit of the UE, wherein the mapping table provides assignment-information about a respective single access mode out of multiple accesses modes assigned to a service requestable by the UE;
the mapping table can also provide assignment-information assigned to multiple services requestable by the UE. Generally, a respective single access mode corresponds to a specific transmission technology in multipath access scenarios. For example, a Wi-Fi single access mode corresponds to a Wi-Fi communication link and a cellular single access mode corresponds to a cellular communication link. Therefore, the table can provide the information that the service "xy" is only accessible via cellular single access;

Receiving service-information about a requested service via a network interface of the UE;
for example, this service-information can be sent by the requested service itself or by a multipath termination endpoint. In an embodiment, the multipath termination point is a service termination point, or it is placed between the UE and the service termination point like in ATSSS and hybrid access scenarios. In principle, this service-information can be present via all the communication links in the multipath scenario or especially via the communication link that corresponds to the single access mode required by the requested service;

Comparing the service-information to entries of the mapping table a processor of the UE, wherein the processor selects the single access mode assigned to the requested service;
The table can provide the information that the service "xy" is only accessible via cellular single access. Consequently, the processor selects the cellular single access for the requested service "xy";

wherein the multi-connectivity functionality of the UE is restricted by a bypass-entity redirecting data traffic associated to the requested service directly to the selected single access mode;
This provides the advantage that the bypass-entity bypasses a multipath-entity of the UE. This saves resources and computational power since no multiple communication links need to be established as it is the common case when using multipath functionalities that are provided by the multipath-entity. Only the appropriate selected single access mode is used. Hence, this enables efficient communication with services which are only accessible in a single access mode and which are not accessible in a multipath scenario. Storing this information in a mapping table offers the advantage that in principle every service can be stored into this mapping table which offers a most flexible solution. There are several reasons existing, why a service is only accessible in a single access mode. A common reason is that no multipath functionality is implemented with respect to that service. The single access can be either any existing access or a very specific access that still needs to be set up by the UE. This alternative can be called a "hard" multi-connectivity breakout;

or a multipath scheduler that schedules data traffic associated to the requested service to a communication link that corresponds to the selected single access mode.
This provides the advantage that the UE can establish its data transfer with the requested service only via the selected single access mode but that the UE can at the same time communicate with other services via another access mode.

This provides full flexibility since there is a trend even in smartphones to execute multiple services in parallel. Hence, this alternative maximizes the overall data throughput, especially if the UE communicates with more than one service over the communication network at a time. This alternative can be called a "soft" multi-connectivity breakout/restriction. Even locally in today's UE there is no known implementation, which can store the information for individual services and map them to non-multi-connectivity transmission modes.

This provides a very flexible solution that can only depend on policy set up by a network provider and/or by a service provider.

In an embodiment, the bypass-entity bypasses a multipath-entity of the UE. This provides the advantage that computational resources within the UE are efficiently used.

The bypass-entity can be arranged ahead of the multipath-entity with respect to the direction of the data traffic. This provides the advantage that there is no need to activate the multipath entity within the UE.

Preferably, the mapping table is dynamically updated. This provides the advantage that the mapping table can be adjusted to new requirements of the requested services or even to the requirements of new services. A mapping table update can be realized by replacing the old mapping table with a new mapping table, by replacing entries of an existing mapping table with new interests or by simply adding new entries at the end of the existing mapping table.

In an embodiment, the UE receives a signal to update the mapping table. The signal can be an external update-signal. This provides the advantage that the mapping table can be efficiently updated without the need that the UE does actively look for new versions of the mapping table. The UE is informed via the update-signal that a new version of the mapping table is existing.

In an embodiment, the update is provided by the operating system (OS), UE vendor/manufacturer, by services and/or by multi-connectivity provider. If the services provide the updates, this provides the advantage that the updates can be provided in very short time periods, whereas if the updates are provided by the OS, UE vendor/manufacturer and/or by multi-connectivity provider these can perform additional security checks and act as trusted update authorities because it is not always the case that all services offered in the Internet are trustworthy. Those updates can be made available in the app stores, like Google Play Store or iOS App store.

In an embodiment, the service-information is identified by an application name, a calling Uniform Resource Locator (URL), a protocol, an IP address, an IP subnet, a port and/or deep packet inspection (DPI). This provides the advantage that the service-information can be obtained in multiple ways offering a high flexibility.

In an embodiment, the selected single access mode is based on a certain security level demand of the requested service. This provides the advantage that critical services can use the single access mode which offers the highest security level. For example, a cellular communication link has generally a higher security level than a trusted public Wi-Fi hotspot.

In an embodiment, the UE detects provider-information and/or access-information and wherein the selected single access mode is based on the provider-information and/or access-information. This provides the advantage that the selected single path access is of a type that is actually supported be the network provider that establishes the connection of the UE with the internet. If the provider only supports cellular access, the selection of a Wi-Fi cellular access as the single access mode would technically not work.

In an embodiment, the entries of the mapping table are based on policy considerations or technical considerations of the network. If the mapping table is based on technical consideration of the network this enables in principle maximum data throughput. While on the other hand, if the entries of the mapping table are based on policy could considerations this offers maximum flexibility in choosing the desired selected single access mode. Policies can include maximum data throughput but the policies can also be optimized with respect to minimal costs of the data transfer.

According to a second aspect of the invention, a user equipment, in particular a smartphone, a tablet, a residential gateway or any other mobile device, is provided, wherein the user equipment is configured to perform a method according to the first aspect of the invention, wherein the UE comprises a memory configured to store a mapping table, wherein the mapping table provides assignment-information about a respective single access mode out of multiple accesses modes assigned to various service requestable by the UE;

a network interface configured to receive service-information about a requested service;

a processor configured to compare the service-information to entries of the mapping table, wherein the processor selects the single access mode assigned to the requested service;

wherein the UE is configured to restrict its multi-connectivity functionality by using a bypass-entity of the UE, wherein the bypass-entity is configured to redirect data traffic associated to the requested service directly to the selected single access mode;

or a multipath scheduler of the UE that is configured to schedule data traffic associated to the requested service to a communication link that corresponds to the selected single access mode.

This provides basically the same advantages as the first aspect of the invention.

According to a third aspect of the invention, a communication system is provided, wherein the communication system comprises a communication network, wherein the communication network is configured to provide multipath functionality over multiple communication links;

a user equipment according to the second aspect of the invention;

a multipath termination endpoint (MP-TE), wherein the user equipment is connected to the multipath termination endpoint via the communication network, wherein the UE is configured to request a service that is provided by the multipath termination endpoint and wherein the multipath termination endpoint transmits service-information of the requested service to the UE via the communication network. The multipath termination endpoint can be realized as being a multi-connectivity provider. This provides the advantage that the service can be made available by the MP-TE but that the user equipment can at the same time taking special demands, like the single access mode, of the service into account and adapt its communication accordingly. If this was not the case, it would not be possible to make the service available by a generic MP-TE.

In the following, numerous features of the present invention are explained in detail via exemplary embodiments. The present disclosure is not limited to the specifically discussed combinations of features. Rather, the features mentioned here can be combined in different ways in other embodiments, unless this is expressly excluded below.

Figure 3:
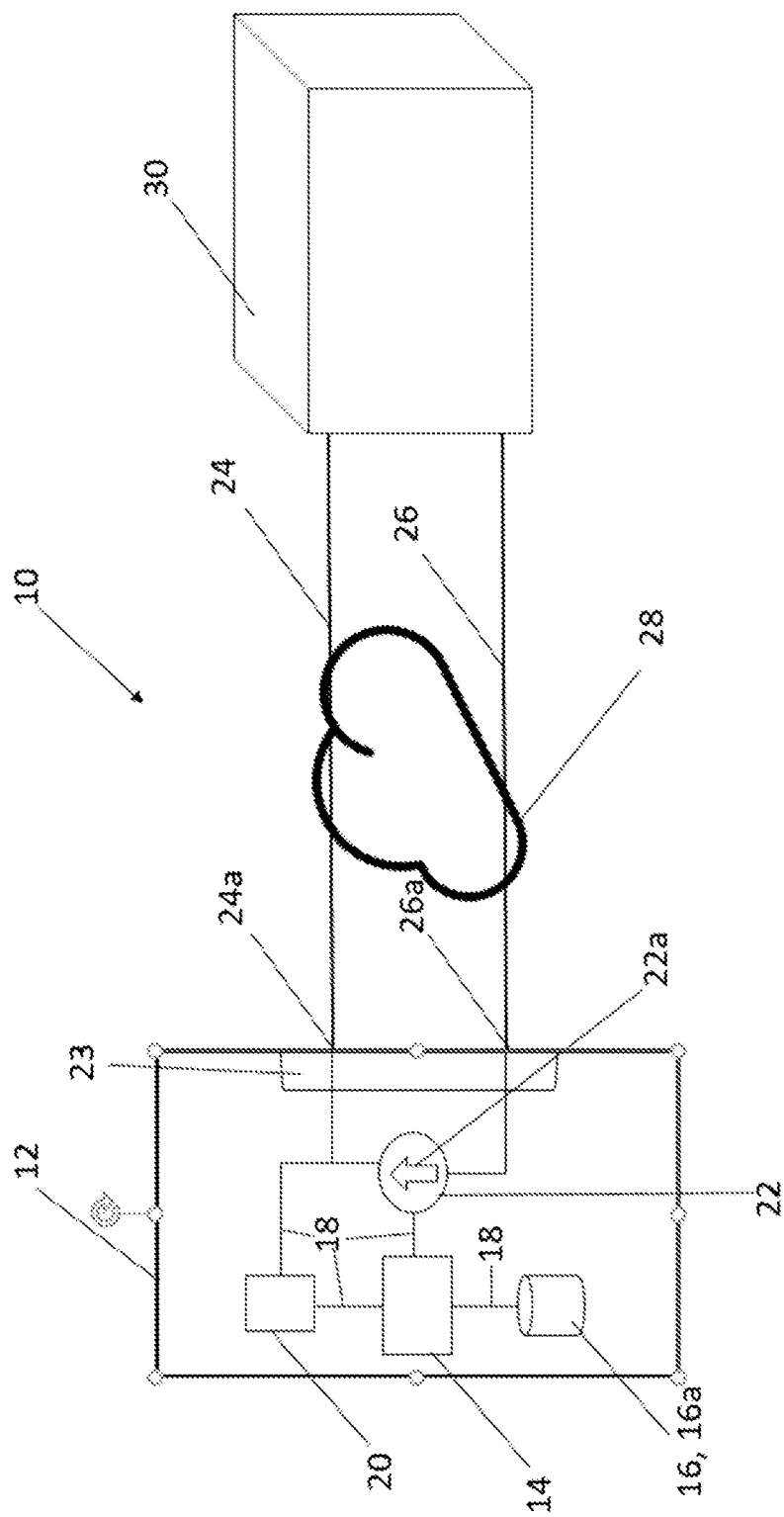
FIG. 3 shows a communication system with a UE according to the invention.

FIG. 3 shows a communication system 10 with a UE according to the invention. A smartphone 12, as the user equipment, is connected to a multipath-termination-endpoint 30 (MP-TE) over a communication network 28 that comprises at least a first communication link 24 and a second communication link 26. The first communication link 24 is established as a cellular communication link 24, wherein the second communication link 26 is established as a Wi-Fi communication link 26. A network interface unit 23 of the smartphone 12 provides a first network interface that enables a first single access mode 24a to the first communication link and a second network interface that enables a second single access mode 26a to the second communication link 26 for the data transfer of the smartphone 12 with the communication network.

Figure 4:
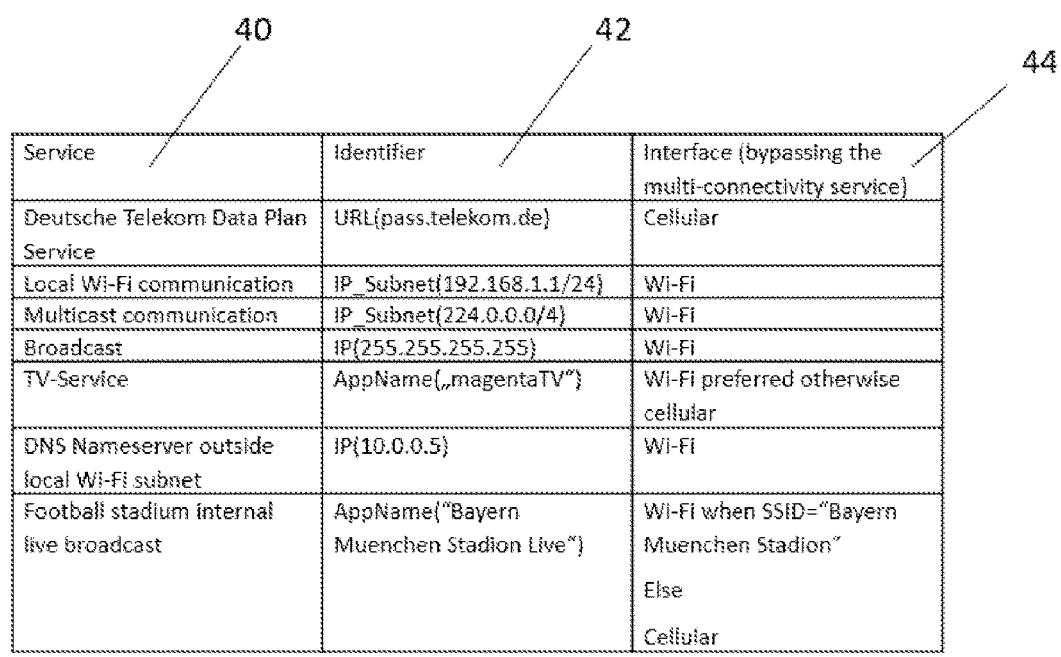
FIG. 4 shows an exemplary mapping table.

The smartphone 12 has a computing unit 14 that comprises a processor configured to execute commands. A memory unit 16 is connected to the computing unit 14 via an internal communication link 18. A mapping table 16a is stored in the memory unit 16, wherein the mapping table comprises entries about various services, identifiers associated to individual services and another entry which specifies which single access mode corresponds to an individual service. FIG. 4 shows an exemplary mapping table and will be explained in the following. The internal communication link 18 also connects a bypass-entity with the computing unit 14. If the computing unit 14 receives service-information about a requested service, it can compare these service-information with entries of the mapping table 16a. If the processor evaluates that the data traffic with the requested service shall be transmitted over the first single access mode 24a according to the mapping table, then the data can be directed through the bypass-entity 20 directly to the first single access mode 24a. In principle it is also possible to directly address the second single access mode 26a by the bypass-entity 20. In the following, the smartphone 12 communicates with the MP-TE 30 only by using the first single access mode 24a without using any multipath functionality of the smartphone 12. This can be called a "hard multipath breakout".

Hence, the bypass-entity 20 provides a way to bypass a multi-path-entity 22, which is implemented in almost all state-of-the-art smartphones 12.

Another option to communicate with a required service that demands data transfer over only one single access mode can be called a "soft multipath breakout/restriction".

In this case the data is directed to the multi-path-entity 22 that is connected to the computing unit 14 by the internal communication link 18. The multi-path-entity 22 comprises a multipath-scheduler 22a that is configured to distribute, in other words schedule, the data to the first single access mode 24a and/or to the second single access mode 26a. If the evaluation of the mapping table 16a yields that only the first single access mode 24a is to be used for the communication with the requested service, then the computing unit transmits appropriate commands to the multipath-scheduler 22a that then efficiently blocks the second single access mode 26a and redirect all the data for the communication with the requested service to the first single access mode 24a. If the smartphone 12 communicates in parallel with another service it is in principle possible that the data corresponding to a first service is purely scheduled to the first single access mode 24a and that the data corresponding to the other service is purely scheduled to the second single access mode 26a.

A multi-connectivity provider can provide an interface, which will be used from services or network providers or access providers, to specify entries of the mapping table 16a from the outside. The mapping table 16a can then be updated with this information.

In addition, based on access and provider detection, the mapping table 16a can change dynamically, e.g. cellular provider services are defined to send on the physical cellular interface. Possibly the detection is done with the help of subscriber identification module (SIM) card information, cell information, access point name (APN), service set identifier (SSID), Wi-Fi beacons, etc. Eventually the mapping table is converted to become part of an OS routing table.

FIG. 4 shows an exemplary mapping table 16a: The mapping table 16a shows three columns, whereas the number of lines of the mapping table 16a corresponds to the number of entries of the respective services.

The first column 40 indicates the specific services, the second column 42 specifies identifiers that help to identify the respective services of the first column 40, whereas the third column 44 shows the single access mode that shall be selected for the communication of the smartphone 12 with the requested service.

For example, the service "Deutsche Telekom Data Plan Service" is being identified by its URL (pass.telekom.de). The processor then evaluates to choose the cellular access mode as the selected single access mode.

As another example, a "Broadcast" service is being identified by its IP number (255.255.255.255). The processor then evaluates to choose the Wi-Fi access mode as the selected single access mode.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for restricting multi-connectivity functionality of a user equipment (UE), the method comprising:
    storing, by the UE, a mapping table, wherein the mapping table comprises assignment information about a respective single access mode assigned to a service requestable by the UE, wherein the respective single access mode is one of multiple access modes usable by the UE, wherein each of the multiple access modes corresponds to a different respective transmission technology, and wherein the multiple access modes comprise a cellular single access mode corresponding to a cellular communication link and a Wi-Fi single access mode corresponding to a Wi-Fi communication link;
    receiving, by the UE, service information about a requested service;
    comparing, by the UE, the received service information to entries of the mapping table;

selecting, by the UE, a single access mode assigned to the requested service based on a respective entry of the mapping table which corresponds to the received service information; and restricting, by the UE, the multi-connectivity functionality of the UE while transmitting data traffic associated with the requested service, wherein restricting the multi-connectivity functionality of the UE while transmitting the data traffic associated with the requested service comprises:
- a bypass entity redirecting the data traffic associated with the requested service such that the data traffic associated with the requested service is transmitted according to the selected single access mode; or
- a multipath scheduler scheduling the data traffic associated with the requested service to a communication link that corresponds to the selected single access mode.

2. The method of claim 1, wherein the bypass entity bypasses a multi-path entity of the UE.

3. The method of claim 2, wherein the bypass entity is arranged ahead of the multi-path entity with respect to the direction of the data traffic.

4. The method of claim 1, wherein the mapping table is dynamically updated.

5. The method of claim 4, wherein the UE receives a signal to update the mapping table.

6. The method of claim 4, wherein the update is provided by an operating system (OS), a vendor or manufacturer of the UE, services, and/or a multi-connectivity provider.

7. The method of claim 1, wherein the service information is identified by an application name, a calling Uniform Resource Locator (URL), a protocol, an IP address, an IP subnet, a port, and/or deep packet inspection (DPI).

8. The method of claim 1, wherein the selected single access mode is based on a security level demand of the requested service.

9. The method of claim 1, wherein the UE detects provider information, and wherein the selected single access mode is based on the provider information.

10. The method of claim 1, wherein the entries of the mapping table are based on policy considerations or technical considerations of the network.

11. The method of claim 1, wherein the mapping table is converted to become part of an operating system (OS) routing table.

12. A user equipment (UE), comprising:
- a memory configured to store a mapping table, wherein the mapping table comprises assignment information about a respective single access mode assigned to a service requestable by the UE, wherein the respective single access mode is one of multiple access modes usable by the UE, wherein each of the multiple access modes corresponds to a different respective transmission technology, and wherein the multiple access modes comprise a cellular single access mode corresponding to a cellular communication link and a Wi-Fi single access mode corresponding to a Wi-Fi communication link;
- a network interface configured to receive service information about a requested service;
- at least one processor configured to:
  - compare the received service information to entries of the mapping table;
  - select a single access mode assigned to the requested service based on a respective entry of the mapping table which corresponds to the received service information; and
  - restrict the multi-connectivity functionality of the UE while transmitting data traffic associated with the requested service, wherein restricting the multi-connectivity functionality of the UE while transmitting the data traffic associated with the requested service comprises: redirecting the data traffic associated with the requested service such that the data traffic associated with the requested service is transmitted according to the selected single access mode; or scheduling the data traffic associated with the requested service to a communication link that corresponds to the selected single access mode.

13. A communication system, comprising
- a communication network configured to provide multipath functionality over multiple communication links;
- a user equipment (UE) having a mapping table stored thereon, wherein the mapping table comprises assignment information about a respective single access mode assigned to a service requestable by the UE, wherein the respective single access mode is one of multiple access modes usable by the UE, wherein each of the multiple access modes corresponds to a different respective transmission technology, and wherein the multiple access modes comprise a cellular single access mode corresponding to a cellular communication link and a Wi-Fi single access mode corresponding to a Wi-Fi communication link; and
- a multipath termination endpoint (MP-TE), wherein the user equipment is connected to the MP-TE via the communication network;
- wherein the UE is configured to request a service that is provided by the MP-TE; and
- wherein the MP-TE is configured to transmit service information of the requested service to the UE via the communication network;
- wherein the UE is further configured to:
  - compare the received service information to entries of the mapping table;
  - select a single access mode assigned to the requested service based on a respective entry of the mapping table which corresponds to the received service information; and
  - restrict the multi-connectivity functionality of the UE while transmitting data traffic associated with the requested service, wherein restricting the multi-connectivity functionality of the UE while transmitting the data traffic associated with the requested service comprises: redirecting the data traffic associated with the requested service such that the data traffic associated with the requested service is transmitted according to the selected single access mode; or scheduling the data traffic associated with the requested service to a communication link that corresponds to the selected single access mode.

* * * * *